(12) United States Patent
Mashima

(10) Patent No.: US 7,191,197 B2
(45) Date of Patent: *Mar. 13, 2007

(54) METHOD AND APPARATUS FOR DETECTING AND TRANSFERRING DATA OF DIFFERENT FORMATS

(75) Inventor: Takao Mashima, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 267 days.

This patent is subject to a terminal disclaimer.

(21) Appl. No.: 10/444,642

(22) Filed: May 22, 2003

(65) Prior Publication Data

US 2004/0044803 A1    Mar. 4, 2004

(30) Foreign Application Priority Data

May 22, 2002   (JP)   .............................. 2002-148070

(51) Int. Cl.
   *G06F 12/00*   (2006.01)
(52) U.S. Cl. ...................... 707/204; 711/147
(58) Field of Classification Search ................ 707/201; 711/147, 202
   See application file for complete search history.

(56) References Cited

U.S. PATENT DOCUMENTS

| | | | |
|---|---|---|---|
| 5,388,013 A | | 2/1995 | Nakamura |
| 5,455,926 A | * | 10/1995 | Keele et al. .................... 711/4 |
| 5,530,845 A | | 6/1996 | Hiatt et al. |
| 5,920,893 A | | 7/1999 | Nakayama et al. |
| 5,983,317 A | * | 11/1999 | Kanda et al. ................ 711/112 |
| 6,505,273 B2 | | 1/2003 | Taroda et al. |
| 6,564,294 B1 | | 5/2003 | Fujibayashi et al. |
| 6,598,129 B2 | * | 7/2003 | Kanda et al. ................ 711/112 |
| 6,625,704 B2 | * | 9/2003 | Winokur ...................... 711/112 |
| 6,697,866 B1 | | 2/2004 | Arakawa et al. |
| 6,735,676 B1 | * | 5/2004 | Kanda et al. ................ 711/147 |
| 6,772,283 B2 | * | 8/2004 | Taroda et al. ................ 711/112 |
| 6,816,958 B2 | * | 11/2004 | Mashima ..................... 711/202 |

FOREIGN PATENT DOCUMENTS

| | | |
|---|---|---|
| JP | 05-020243 A | 1/1993 |
| JP | 09-258908 | 10/1997 |
| JP | 10-112136 A | 4/1998 |
| JP | 2000-267816 A | 9/2000 |
| JP | 2001-022715 A | 1/2001 |

OTHER PUBLICATIONS

Office Action issued by the Japan Patent Office (JPO) for patent application JP2002-148070 (Nov. 7, 2006).

* cited by examiner

*Primary Examiner*—Jeffrey Gaffin
*Assistant Examiner*—Susan Y Chen
(74) *Attorney, Agent, or Firm*—Townsend and Townsend and Crew LLP

(57) ABSTRACT

A storage control apparatus comprises a first storage area and a second storage area. Data in the first storage area is stored according to a first data format, and a host computer can exchange data with it using data access commands of the first data format. Data in the second storage area is stored according to a second data format different from the first data format, and a host computer can exchange data with it using data access commands of the second data format. The storage control apparatus further comprises a data recording format conversion unit that is configured to convert and store data that is stored in the first storage area to the second storage area.

20 Claims, 6 Drawing Sheets

INTERMEDIATE VOLUME → MAINFRAME

INTERMEDIATE VOLUME → OPEN VOLUME

METHOD AND APPARATUS FOR DETECTING AND TRANSFERRING DATA OF DIFFERENT FORMATS

CROSS-REFERENCE TO RELATED APPLICATION

The present application claims priority upon Japanese Patent Application No. 2002-148070 filed May 22, 2002, which is herein incorporated by reference.

BACKGROUND OF THE INVENTION

1. Field of the Invention

The present invention relates to a storage control apparatus and a method for controlling a storage control apparatus.

2. Description of the Related Art

Recent computer systems, such as those used in corporations, are configured using so-called open system computers (hereinafter referred to simply as "open computers") such as personal computers and workstations.

However, in order to effectively use resources that have been accumulated throughout the years and to comply with demands such as high stability and high reliability, mainframe computers (or general-purpose computers; hereinafter referred to as "mainframes") still remain in high demand, for example, in areas of online and backbone business. In recent years, for example, there are systems configured as "mixed systems" in which a mainframe is used where needed while open computers are employed for information-related jobs such as jobs involving decision-making and analysis.

Note that such a system is disclosed, for example, in U.S. Pat. No. 5,530,845. In this system, a mainframe and a plurality of open computers of different types are connected to a single storage control apparatus, and the storage control apparatus is emulated by a controller (Programmable Storage Controller).

For open computers, the FBA (Fixed Block Architecture) format, in which designation is made in terms of logical block address, is generally used as a recording format for the disk drives; on the other hand, for mainframes, the CKD (Count Key Data) format, in which designation is made in terms of cylinder numbers, head numbers, and record numbers, is employed as a recording format for the disk drives. Open computers can only access data stored in FBA format, while mainframes can only access data stored in CKD format. Therefore, open computers cannot directly use mainframe's data, and conversely mainframe cannot directly use open computers' data.

To avoid such an inconvenience, a mechanism is known in which, as shown in FIG. 6, conversion software 70 for converting CKD format data of a mainframe 10 into FBA format data of open computers 20 is made to run on the open computers 20, and the open computers 20 convert the recording format of data stored in a storage control apparatus 30. (See, e.g., Japanese Patent Application Laid-open Publication No. 9-258908.)

However, such a mechanism has the following problems:

(1) The conversion software 70 must be provided for each of the open computers 20, thus resulting in much time and effort for installation, upgrade and other maintenance work. Moreover, the conversion software 70 will consume resources such as the open computers' storage areas and processors.

(2) The user of the open computer has to perform the conversion. Therefore, the users will have to be aware of jobs associated with conversion.

(3) Data transfer associated with conversion boosts traffic of the communication lines between the storage control apparatus 30 and the open computers 20, thus putting stress on other communications. Additionally, conversion efficiency varies depending on the performance of the communication lines.

(4) Conversion is performed on the open computers 20. This affects processing of other programs executed on the open computers 20. Moreover, high processing capability is required of the open computers 20, thus resulting in increased equipment costs.

(5) Exclusive control is fundamentally required to allow the mainframe 10 and the open computers 20 to access data in the storage control apparatus 30. However, there is no mechanism available at present that provides effective exclusive control in a mixed system comprised of the mainframe 10 and the open computers 20. Designing such a mechanism afresh requires a considerable amount of time, effort, and cost. Therefore, the mechanism for exclusive control has to be made up for through appropriate management operations.

SUMMARY OF THE INVENTION

The present invention has been conceived in order to overcome the above and other problems. An object of the present invention to provide a method of controlling a storage control apparatus and a storage control apparatus, enabling data stored by a mainframe and data stored by an open system to be efficiently and conveniently provided as data in recording formats that can be used by both the mainframe and the open system.

To achieve the above and other objects, according to an aspect of the present invention, a storage control apparatus comprises: a storage area A in which data is stored according to a recording format $\alpha$, the recording format $\alpha$ being a format in which an open computer reads/writes data; a storage area B in which data is stored according to a recording format $\beta$, the recording format $\beta$ being a format in which a mainframe computer reads/writes data; a data input/output unit x for receiving a data input/output request from the open computer, and inputting/outputting data to/from the storage area A in response to the request; a data input/output unit y for receiving a data input/output request from the mainframe computer, and inputting/outputting data to/from the storage area B in response to the request; and a data recording format conversion unit X capable of storing data that is stored in the storage area A according to the recording format $\alpha$ into the data storage area B according to the recording format $\beta$.

Features and objects of the present invention other than the above will become clear by reading the description of the present specification with reference to the accompanying drawings.

BRIEF DESCRIPTION OF THE DRAWINGS

For more complete understanding of the present invention and its advantages, the following description should be read in conjunction with the accompanying drawings, in which.

DESCRIPTION OF THE PREFERRED EMBODIMENTS

Figure 1:
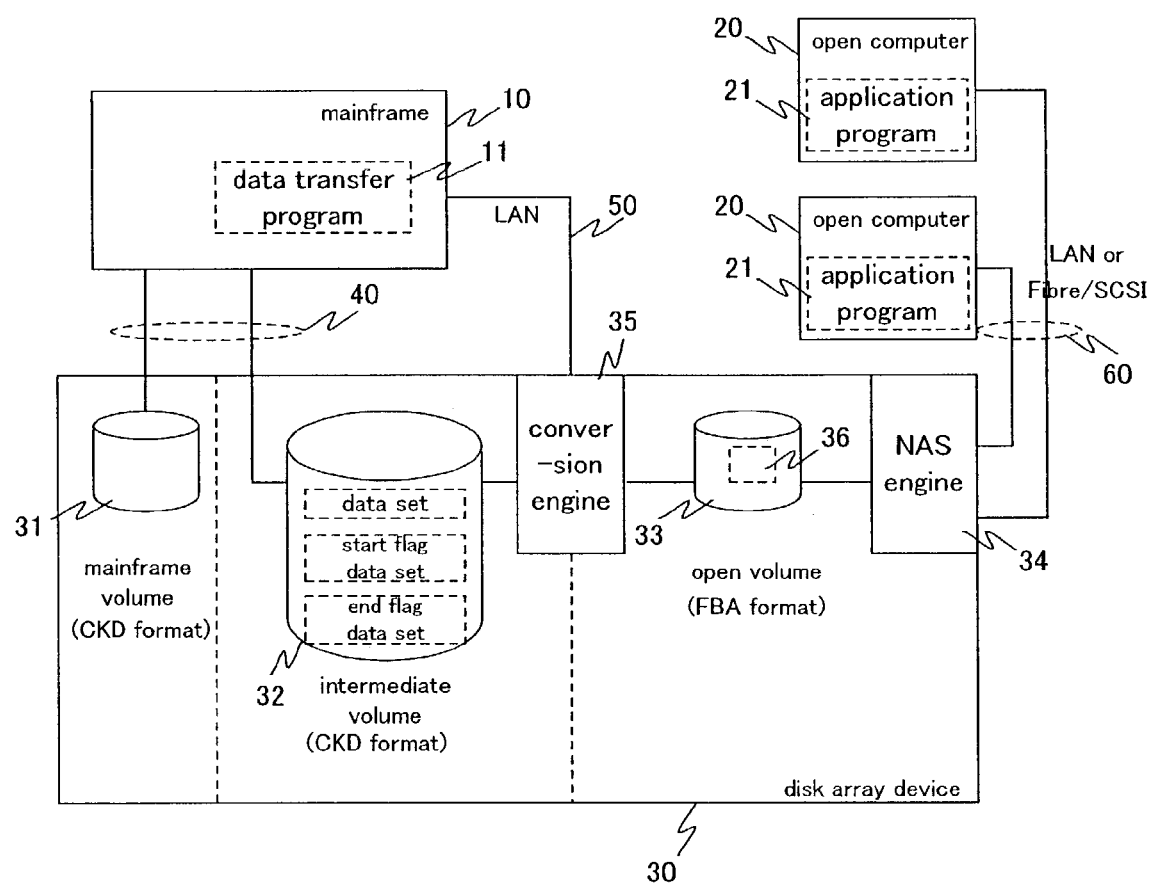
FIG. 1 is a diagram showing a schematic configuration of a storage apparatus system which is described as an embodiment of the present invention.

At least the following matters will be made clear by the explanation in the present specification and the description of the accompanying drawings.

<Outline of the Disclosure>

According to one aspect of the present invention, a storage control apparatus comprises: a storage area A in which data is stored according to a recording format $\alpha$, the recording format $\alpha$ being a format in which an open computer reads/writes data; a storage area B in which data is stored according to a recording format $\beta$, the recording format $\beta$ being a format in which a mainframe computer reads/writes data; a data input/output unit x for receiving a data input/output request from the open computer, and inputting/outputting data to/from the storage area A in response to the request; a data input/output unit y for receiving a data input/output request from the mainframe computer, and inputting/outputting data to/from the storage area B in response to the request; and a data recording format conversion unit X capable of storing data that is stored in the storage area A according to the recording format $\alpha$ into the data storage area B according to the recording format $\beta$.

The recording format $\alpha$ is, for example, the FBA format. The recording format $\beta$ is, for example, the CKD format. The storage control apparatus is, for example, a disk array apparatus (mentioned later). The storage area A is, for instance, an open volume (discussed later). The data input/output unit x has, for example, a NAS engine (mentioned later) that is equipped with capabilities to function as a so-called file system (e.g., NFS), which, for example, receives a data input/output request from an open computer through file name designation and specifies data stored in the storage area A by the file name. The data input/output unit y is communication means compliant with ACONARC (registered trademark) and the like. The conversion unit X is, for instance, a conversion engine (discussed later). Note that "data" may be in a file format or may even be control information.

Further, the storage control apparatus may be configured to have a data recording format conversion unit Y capable of storing data that is stored in the storage area B according to the recording format $\beta$ into the data storage area A according to the recording format $\alpha$. Note also that in this case, the conversion unit X can be provided, but it does not have to be provided. The conversion unit Y is, for instance, a conversion engine which will be discussed later.

Further, the conversion unit X may be capable of recognizing that new data has been written by the data input/output unit x to a specific storage area on the storage area A, and, in case of the recognition, automatically storing the new data in the storage area B according to the recording format $\beta$. This allows simple and convenient conversion of data stored in the recording format $\alpha$ into the recording format $\beta$. Note that the specific storage area is designated, for instance, as a directory in the file system.

Further, the conversion unit Y may be capable of recognizing that new data has been written by the data input/output unit y to the storage area B, and in case of the recognition, automatically storing the new data in the storage area A according to the recording format $\alpha$. This allows simple and convenient conversion of data stored in the recording format $\beta$ into the recording format $\alpha$. This process corresponds, for example, to the process in S315 which will be discussed later.

Further, while certain data in either the storage area A or the storage area B is being processed, the conversion unit X may be capable of performing exclusive control over the certain data. Furthermore, while certain data in either the storage area A or the storage area B is being processed, the conversion unit Y may be capable of performing exclusive control over the certain data. This process corresponds, for example, to the process in S515 which will be discussed later.

Further, another aspect of the present invention is a method for controlling such a storage control apparatus as that described above. The conversion unit X and the mainframe computer are connected to each other via an interface for enabling communication such as a LAN. The method comprises: when recognition is made that new data has been written into a specific storage area of the storage area A, sending a message indicative of the recognition to the mainframe computer through the interface using the conversion unit X; upon receiving the message, securing a write destination area on the storage area B using the mainframe computer, the write destination area being a storage area in the storage area B into which the data is to be stored; and storing the data stored in the storage area A into the write destination area according to the recording format $\beta$ using the conversion unit X. This ensures simple and convenient conversion from the open computers.

Here, the processes in which the conversion unit X sends, when recognition is made that new data has been written into a specific storage area of the storage area A, a message indicative of the recognition to the mainframe computer through the interface correspond, for example, to the processes S211 to S214 described later. Further, the processes in which the mainframe computer secures, upon receiving the message, a write destination area (which is a storage area in the storage area B into which the data is to be stored) on the storage area B correspond, for example, to the processes S311 to S313 described later. Further, the processes in which the conversion unit X stores the data stored in the storage area A into the write destination area according to the recording format $\beta$ correspond, for example, to the processes S215 to S219 described later.

By providing the conversion unit X such as conversion software within the storage control apparatus eliminates the need for providing conversion software for each open computer, thereby keeping the apparatus free of maintenance such as installation and upgrade and preventing consumption of resources such as the open computers' storage areas and processors.

Moreover, the open computers' users are relieved of the burden of conversion tasks. Therefore, the users do not have to keep an eye on conversion processes. By making it possible to automatically detect update files (hand-over files), it becomes possible to perform automatic data format conversion of files within the storage control apparatus.

The traffic of the communication lines between the storage control apparatus and the open computers will not increase, and conversion efficiency remains unaffected by the performance of the communication lines. This ensures faster data conversion and faster open system data access.

Since conversion processes are not performed on the open computers, processes of other programs on the open computers remain unaffected. Moreover, high processing capability is not required of the open computers, thus keeping the cost of building a system low. Additionally, data both before and after conversion, which in conventional cases had to be stored in each open system, is managed by the storage control apparatus in a unified manner, thus ensuring effective use of storage resources.

Further, using the open computers, it becomes possible to easily perform, for example, jobs involving/supporting decision-making such processes for data warehouses using the mainframe's data, or online transaction processing in place of the mainframe. This makes it possible to eliminate barriers between the open system and the mainframe and provide a highly compatible, flexible system that can meet a variety of needs.

EXAMPLES

FIG. 1 shows a schematic configuration of the storage apparatus system described as an embodiment of the present invention. At least one mainframe 10 and at least one open computer 20, such as a personal computer or a UNIX (registered trademark) machine, are connected to a disk array apparatus 30. Note that the disk array apparatus 30 is provided with a file system which will be discussed later and has the capabilities to function as a so-called NAS (Network Attached Storage).

The mainframe 10 and the disk array apparatus 30 are connected by communication means 40 compliant with ACONARC (registered trademark) and the like. Note that the mainframe 10 and the disk array apparatus 30 are also connected by a LAN (Local Area Network) 50. Note also that the open computers 20 and the disk array apparatus 30 are connected by communication means 60 such as LAN or Fibre/SCSI.

The disk array apparatus 30 has, for example: a CPU; a control memory; physical devices such as disk drives; a data controller for controlling data input to and output from physical devices; and a cache memory. A mainframe volume 31, an intermediate volume 32, and an open volume 33 are arranged on the storage area provided by the disk array apparatus 30's disk drives. Data is stored in the mainframe volume 31 and the intermediate volume 32 in the CKD format. Data is stored in the open volume 33 in the FBA format.

A NAS engine runs on the apparatus 30. The NAS engine is a file system that is capable of receiving a data input/output request through file name designation from the open computer 20, which is connected to the disk array apparatus 30 via the communication means 60, and inputting data to or outputting data from the open volume 33 on a file-by-file basis. For example, NFS (Network File System) is employed as a file system.

Data input to or output from the open volume 33 by the open computer 20 is stored on the open volume 33 as files. Note that directories can be arranged on the open volume 33. A directory is a storage area in which at least one file is stored in association with the directory. The disk array apparatus 30 performs data input/output to/from the mainframe volume 31 and the intermediate volume 32 in response to a data input/output instruction sent from the mainframe 10 via the communication means 40.

A conversion engine 35 runs on the disk array apparatus 30. The conversion engine 35 allows data that is included in files stored in FBA format on the open volume 33 to be stored on the intermediate volume 32 as CKD format data. The conversion engine 35 also allows data that is stored on the intermediate volume 32 in CKD format to be stored on the open volume 33 as an FBA format file. Note that the functions of the conversion engine 35 are provided, for example, by software executed on the disk array apparatus 30.

A data transfer program runs on the main frame 10. The data transfer program provides the function to input/output data to/from the mainframe volume 31 and the intermediate volume 32, which comply with the CKD format, by designating the cylinder number, the head number, and the record number via the communication means 40. The data transfer program also provides the function to communicate with the conversion engine via the LAN 50. Note that the communication means 40 may or may not be connected to the LAN 50.

An application program 21 runs on the open computer 20. The application program 21 provides the function to make a data input/output request to the NAS engine through file-name designation.

Next, the processes performed in the storage control apparatus system configured as discussed above when data managed by the open volume 33 in FBA format is used in the mainframe 10, and the processes performed in the system when data managed by the mainframe volume 31 in CKD format is used in the open computer 20 are described.

<Format Conversion>

Figure 2:
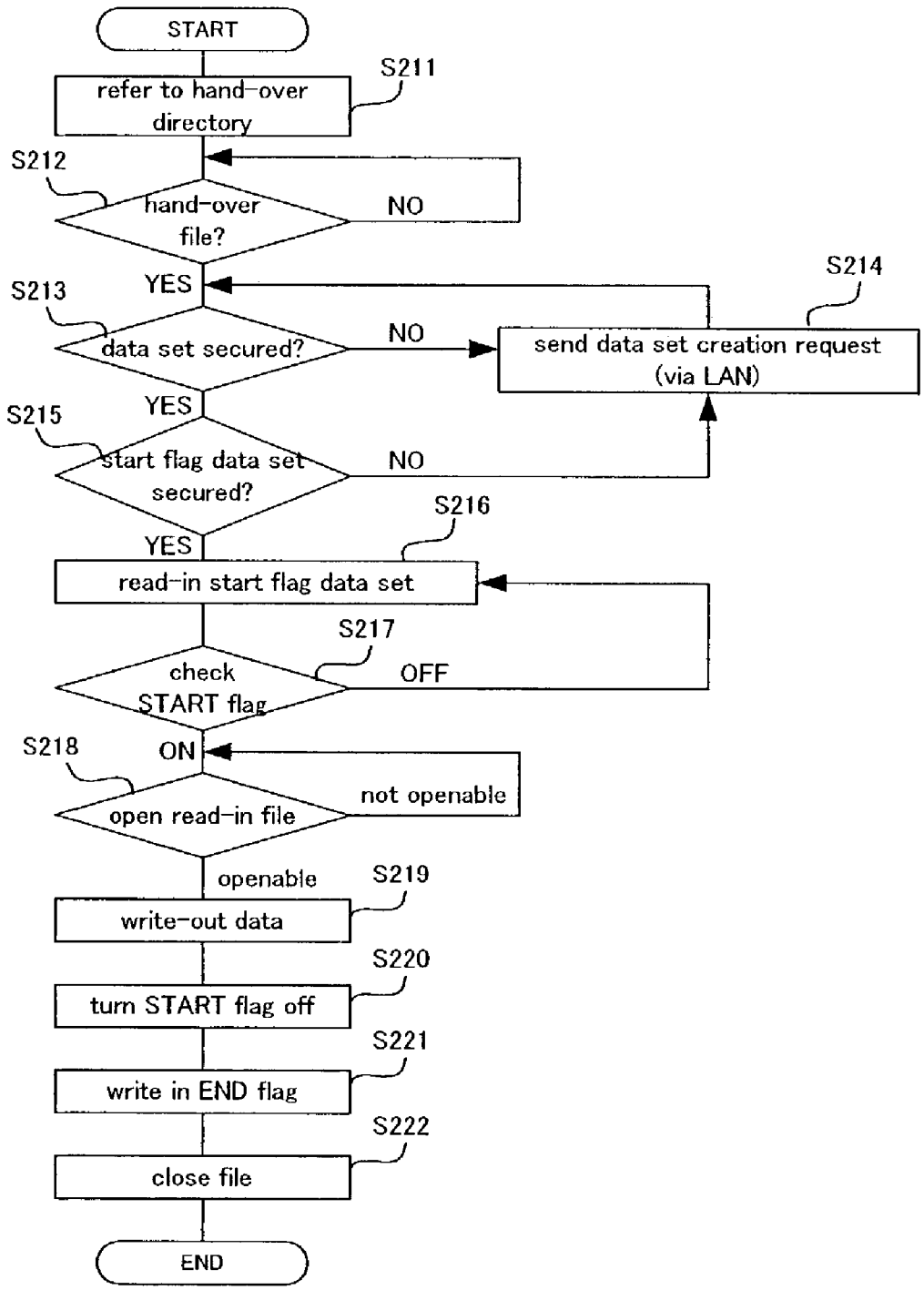
FIG. 2 is a flowchart describing processes performed by a conversion engine according to the embodiment of the present invention.
Figure 3:
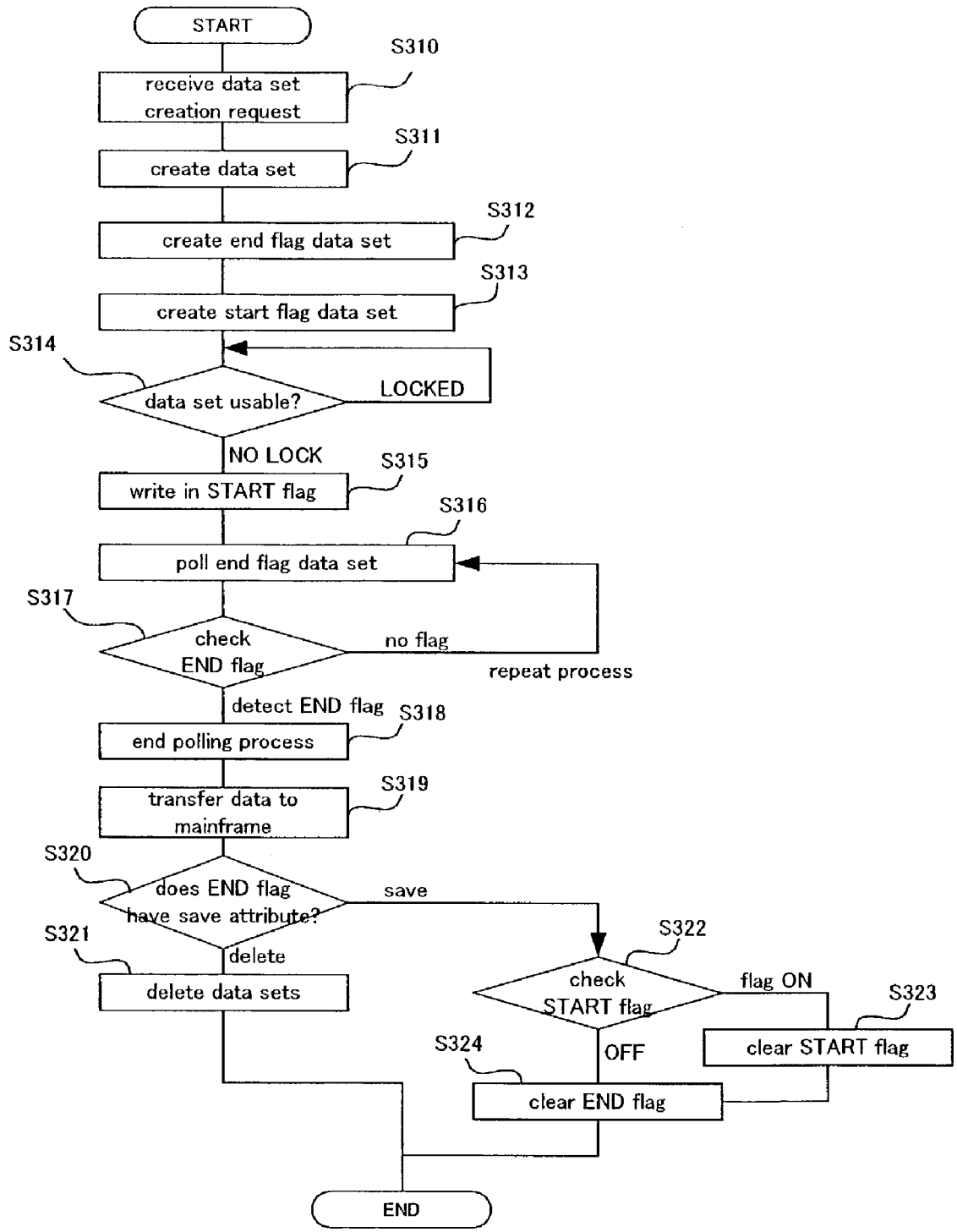
FIG. 3 is a flowchart describing processes performed by a data transfer program on the mainframe according to the embodiment of the present invention.

(1) First, the processes performed when the mainframe 10 uses the data managed by the open volume 33 in FBA format are described by referring to the flowcharts shown in FIG. 2 and FIG. 3. Note that FIG. 2 shows the processes performed by the conversion engine 35 while FIG. 3 shows the processes performed by a data transfer program 11 running on the mainframe 10.

A hand-over directory 36, which stores files to be used by the mainframe 10, is made in the open volume 33. This directory 36 stores files (hereinafter called "hand-over files") to be used by the mainframe 10.

The conversion engine 35 references the contents of the hand-over directory 36 in real time through, for example, polling (S211). Detecting that a new hand-over file has been stored in the hand-over directory 36 (S212), the conversion engine 35 checks whether a storage area for a data set, which serves as the destination to which converted data is written, has been secured on the intermediate volume 32 (S213). A "data set" is, for example, a storage area allocated in the intermediate volume 32 for data exchange purposes when the mainframe 10 writes data to or reads data from the intermediate volume 32. If no data set has been secured on the intermediate volume 32, the conversion engine 35 sends a data set creation request to the mainframe 10 via the LAN 50 (S214).

When the data transfer program 11 running on the mainframe 10 receives the creation request from the conversion engine 35, the program 11 secures storage areas on the intermediate volume 32 for each of a data set, a start flag data set, and an end flag data set (S311 to S313) as shown in FIG. 3 and in FIG. 1. The start flag data set stores an ON flag indicating whether data has been stored in that data set, and a START flag indicating whether that data set is accessible. The START flag is turned on, for example, when the conversion engine 35 can write data to the data set. The end flag data set stores an END flag indicating whether data write operation to the data set is complete.

When a storage area for the data set, to which converted data will be written, is secured, the conversion engine 35 checks whether a storage area for the start flag data set has been secured on the intermediate volume 32 as shown in FIG. 2 (S215). If no storage area is secured, the conversion engine 35 sends a data set creation request to the mainframe 10 (S214). When the conversion engine 35 finds that the start flag data set has been created, the engine reads-in the start flag data set (S216) and checks the status of the START flag (S217). If the START flag is on, the engine opens the hand-over file in an exclusive manner (S218) and writes the data included in the hand-over file to the data set (S219). After this write operation is complete, the conversion engine 35 turns the START flag off (S220) and writes an END flag in the end flag data set (S221). Then the engine 35 cancels the exclusive control of the hand-over file and closes the file (S222).

On the other hand, the data transfer program 11 monitors whether the data set is available for use (whether the data set is under exclusive control) in real time as shown in FIG. 3 (S314) and, if the data set is available for use (if it is not under exclusive control), turns on the START flag in the start flag data set (S315). Other programs determine whether a relevant data set is under exclusive control depending on whether the START flag is on. In other words, when the START flag is turn on, the relevant data set is put under exclusive control in which they can be used only by the data transfer program 11.

Further, the data transfer program 11 monitors in real time through polling whether an END flag has been written to the end flag data set (S316 and S317). When the program 11 detects through this monitoring that the END flag has turned on, then the data transfer program 11 terminates polling (S318) and transfers the data written in the data set to the mainframe volume 31 (S319).

Next, the data transfer program 11 examines whether the END flag indicates a "data set save attribute", meaning that the data sets should be saved (S320). If the END flag does not indicate a data set save attribute, after transferring the relevant data, the program 11 deletes the data set, the start flag data set, and the end flag data set from the intermediate volume 32 (S321).

On the other hand, if the END flag indicates a data set save attribute, the data transfer program 11 checks whether the START flag in the start flag data set is on (S322). If the flag is on, the program 11 turns it off (S323). The program also turns off the END flag in the end flag data set and terminates its processes (S324). Note that the processes are repeated the next time by copying data to the data set and then turning on the START flag in the start flag data set.

According to the processes described above, data managed by the open volume 33 in FBA format is stored in the mainframe volume 31. Accordingly, data that was previously stored in FBA format on the open volume 33 can now be used from the mainframe 10.

Figure 4:
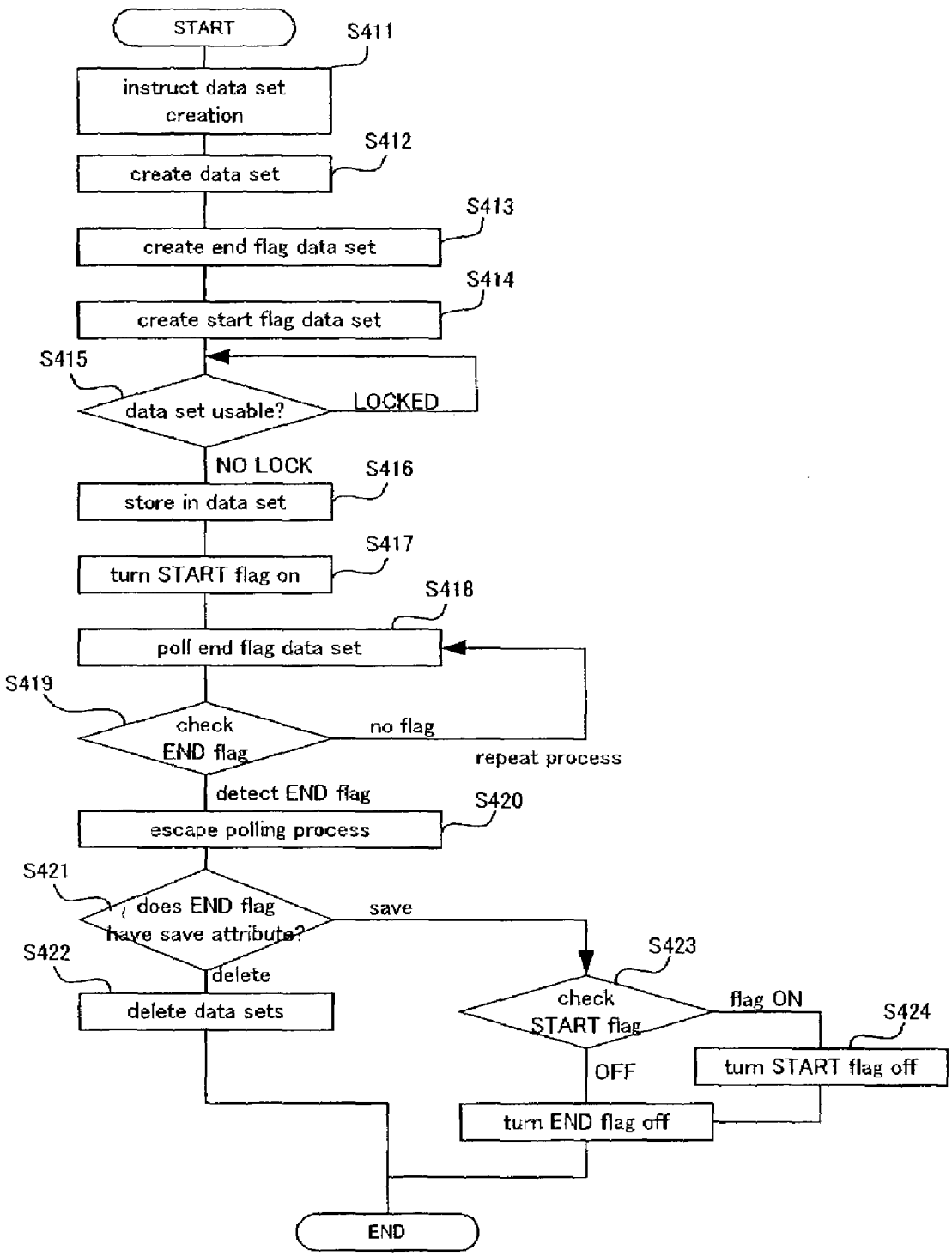
FIG. 4 is a flowchart describing processes performed by the data transfer program on the mainframe according to the embodiment of the present invention.
Figure 5:
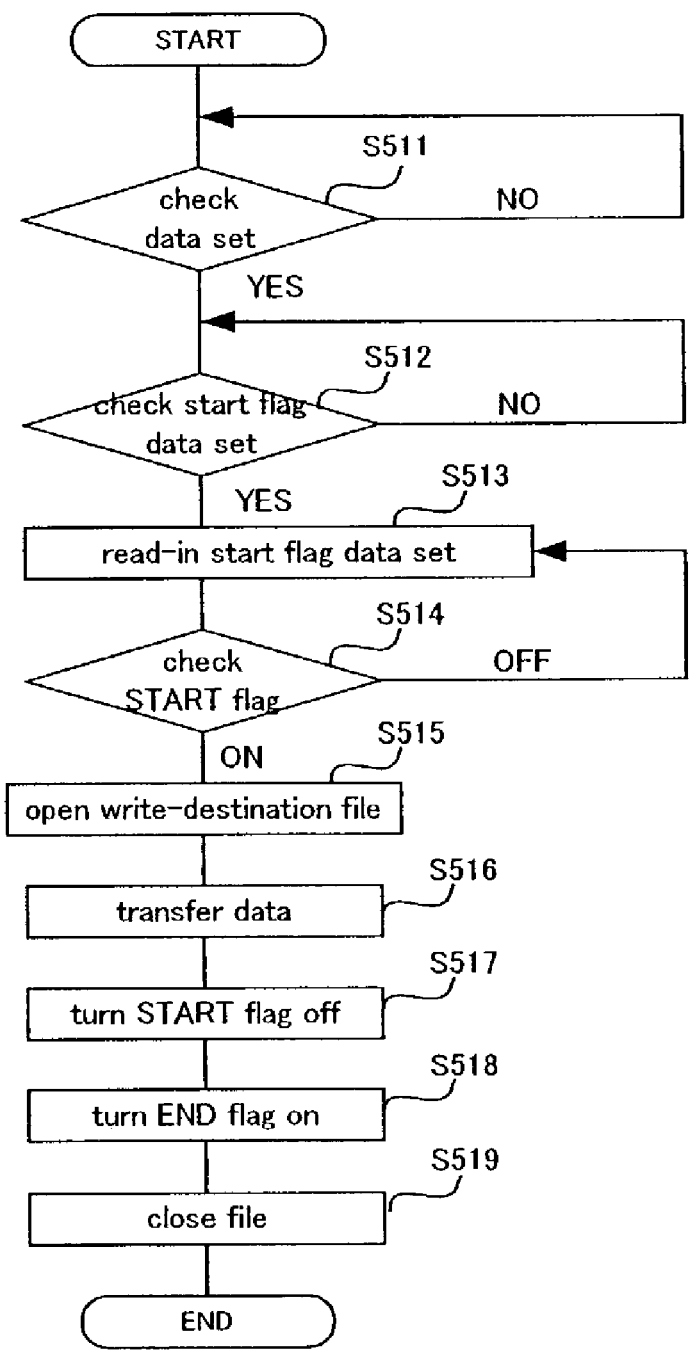
FIG. 5 is a flowchart describing processes performed by the conversion engine according to the embodiment of the present invention.
Figure 6:
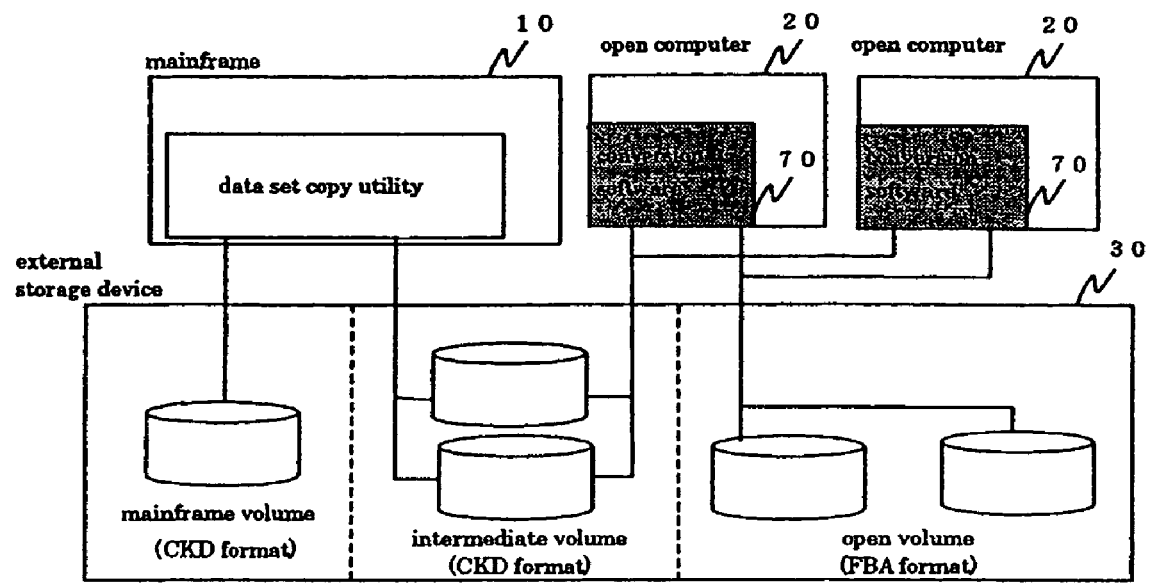
FIG. 6 is a diagram showing a schematic configuration of a conventional storage apparatus system.

(2) Next, the processes performed when the open computer 20 uses the data managed by the mainframe volume 31 in CKD format are described by referring to the flowcharts shown in FIG. 4 and FIG. 5. Note that FIG. 4 shows the processes performed by the data transfer program 11 running on the mainframe 10 while FIG. 5 shows the processes performed by the conversion engine 35.

As shown in FIG. 4, the mainframe 10's user or some other person (or the mainframe 10 itself) makes and instruction to create data sets on the intermediate volume 32 (S411) by manipulating the mainframe 10's user interface. The data transfer program 11 creates a data set, a start flag data set, and an end flag data set on the intermediate volume 32 in response to the creation instruction (S412 to S414).

Next, the data transfer program 11 checks whether the data set is available for use (whether the data set is under exclusive control) (S415). Here, if the data set is available for use, that is, if the data set is not under exclusive control, the data transfer program 11 stores, in the data set, data to be handed over from the mainframe volume 31 to the open computer 20 (hereinafter called "hand-over data") (S416). Then the data transfer program 11 turns on the START flag in the start flag data set (S417).

The data transfer program 11 monitors the END flag status in real time by polling the end flag data set (S418). If the END flag is on (S419), the data transfer program 11 terminates polling (S420).

Next, the data transfer program 11 examines whether the END flag indicates a "data set save attribute" (S421). Here, if the END flag does not indicate a data set save attribute, the program deletes the data set, the start flag data set, and the end flag data set created on the intermediate volume 32 (S422).

On the other hand, if the END flag indicates a data set save attribute, the data transfer program 11 checks the status of the START flag in the start flag data set (S423). If the flag is on, the program 11 turns the flag off (S424). The program also turns off the END flag in the end flag data set (S425). In this way, hand-over data is stored in the data set on the intermediate volume.

On the other hand, the conversion engine 35 monitors in real time whether a data set has been created on the intermediate volume 32 as shown in FIG. 5 (S511). If the conversion engine 35 detects that a data set has been created on the intermediate volume 32, it checks whether there is a start flag data set for that data set on the intermediate volume 32 (S512). If there is a start flag data set, the engine 35 reads-in the start flag data set (S513) and checks whether the START flag is on (S514). Here, if the START flag is on, the engine 35 opens the write destination file (i.e., the file onto which the hand-over data is written) on the open volume 33 under exclusive control. At this time, if there is no write destination file, the program creates a write destination file afresh on the open volume 33 (S515).

Next, the conversion engine 35 writes the data, which has been written to the data set, to the open volume 33 (S516). This allows data for the mainframe 10 to be stored on the open volume 33 as a file in FBA format. After write operation is complete, the conversion engine 35 turns the START flag off (S517) and turns on the END flag in the end flag data set (S518). Further, the engine closes the write destination file (S519).

According to the processes mentioned above, data managed by the mainframe volume 31 in CKD format is stored on the open volume 33 as FBA format file. Accordingly, data that was previously stored on the mainframe volume 31 in CKD format can now be used on the open volume 33.

<Other Examples>

The system can be configured so that the mainframe 10 makes a designation of a file stored on the open volume 33 to the conversion engine 35 via the LAN 50, and the conversion engine 35 stores the data in the designated file in the intermediate volume 32 as CKD format data. Instead, the system can be configured so that the mainframe 10 designates a data set on the intermediate volume 32 and the conversion engine 35 stores it on the intermediate volume 32 as FBA format data.

Moreover, it is possible to connect the open computer 20, the conversion engine 35, and the mainframe 10 by a LAN such that the open computer 20 instructs the mainframe 10 to transfer data, which is stored on the mainframe volume 31, to the intermediate volume 32, thus allowing the conversion engine 35 to automatically store that data on the open volume 33 as FBA format file.

As discussed above, according to the embodiments of the present invention, data stored by a mainframe and data stored by an open system can efficiently and conveniently be provided as data in recording formats that can be used by both the mainframe and the open system.

Although the preferred embodiment of the present invention has been described in detail, it should be understood that various changes, substitutions and alterations can be made therein without departing from spirit and scope of the inventions as defined by the appended claims.

What is claimed is:

1. A storage control apparatus comprising:
    a disk storage area A in which data is stored according to a recording format α;
    a disk storage area B in which data is stored according to a recording format β, said recording format β being a format different from said recording format α;
    an intermediate disk storage area in which data is stored according to said recording format β;
    a data IO unit x operatively coupled to said disk storage area A, and configured for receiving a data IO request from a first computer to exchange data with said disk storage area A;
    a data IO unit y operatively coupled to said disk storage area B, and configured for receiving a data IO request from a second computer to exchange data with said disk storage area B;
    a data recording format conversion unit X configured to perform steps of:
        detecting that data to be transferred has been completely written to an area of said disk storage area A according to said format a in response to a write operation,
        securing storage areas for a data set and an end flag data set on said intermediate disk storage area,
        writing said data to be transferred into said data set according to said recording format β upon completion of said write operation, and
        writing an end flag indicating that said write operation is complete; and
        a data transfer unit configured to transfer data from said data set to said disk storage area B when said end flag is written to said end flag data set.

2. A storage control apparatus according to claim 1, wherein said recording format a is FBA (fixed block architecture).

3. A storage control apparatus according to claim 1, wherein said recording format β is CKD (count, key, data).

4. A storage control apparatus according to claim 1, wherein said data IO unit x has a file system configured to:
    receive, from said first computer, said data IO request according to a file name designation, and
    identify data stored in said disk storage area A according to said file name designation.

5. A storage control apparatus according to claim 4, wherein said file system is NFS (network file system).

6. A storage control apparatus according to claim 1, wherein said conversion unit X is configured to perform steps of:
    detecting that new data has been written by said data IO unit x to a specific storage area on said disk storage area A according to said recording format α, and
    in response to said detecting, writing said new data in said disk storage area B according to said recording format β.

7. A storage control apparatus according to claim 6, wherein:
    said data IO unit x has a file system configured to:
        receive, from said first computer, said data IO request according to a file name designation, and
        identify data stored in said disk storage area A according to said file name designation; and
    wherein said specific storage area is designated as a directory in said file system.

8. A storage control apparatus according to claim 1, wherein,
    while certain data in either said disk storage area A or said disk storage area B is being processed,
    said conversion unit X takes exclusive control of said certain data.

9. A storage control apparatus comprising:
    a disk storage area A in which data is stored according to a recording format α;
    a disk storage area B in which data is stored according to a recording format β, said recording format β being a format that is different from said recording format α;
    an intermediate disk storage area in which data is stored according to said recording format α;
    a data IO unit x for receiving a data IO request from an open computer, and for exchanging data with said disk storage area A in response to said request;
    a data IO unit y for receiving a data IO request from a mainframe computer, and for exchanging data with said disk storage area B in response to said request;
    a data recording format conversion unit Y configured to perform steps of:
        detecting that data to be transferred has been completely written to an area of said disk storage area B according to said format β in response to a write operation,
        securing storage areas for a data set and an end flag data set on said intermediate disk storage area;
        writing said data to be transferred into said data set according to said recording format a upon completion of said write operation; and
    a data transfer unit configured to transfer data from said data set to said disk storage area A when said end flag is written to said end flag data set.

10. A storage control apparatus according to claim 9, wherein said recording format α is FBA.

11. A storage control apparatus according to claim 9, wherein said recording format β is CKD.

12. A storage control apparatus according to claim 9, wherein said data IO unit x has a file system configured to:
    receive, from said open computer, said data IO request according to a file name designation, and
    identify data stored in said disk storage area A according to said file name designation.

13. A storage control apparatus according to claim 12, wherein said file system is NFS.

14. A storage control apparatus according to claim 9, wherein said conversion unit Y is configured to perform steps of:
   detecting that new data has been written by said data IO unit y to said disk storage area B according to said recording format β, and
   in case of said detecting, writing said new data in said disk storage area A according to said recording format α.

15. A storage control apparatus according to claim 9, wherein,
   while certain data in either said disk storage area A or said disk storage area B is being processed,
   said conversion unit Y takes exclusive control of said certain data.

16. A method for controlling a storage control apparatus, said storage control apparatus including: a storage area A in which data is stored according to a recording format α, said recording format a being a format in which an open computer reads and writes data; a storage area B in which data is stored according to a recording format β, said recording format β being a format in which a mainframe computer reads and writes data; a data IO unit x for receiving a data IO request from said open computer, and for exchanging data with said storage area A in response thereto; a data IO unit y for receiving a data IO request from said mainframe computer, and for exchanging data with said storage area B in response thereto; and a data recording format conversion unit X is configured to perform steps of detecting that data to be transferred has been completely written to an area of said storage area A according to said recording format a in response to a write operation, and writing said data into said storage area B according to said recording format β upon completion of said write operation;
   wherein said conversion unit X and said mainframe computer are connected to each other via an interface for enabling communication,
   said method comprising:
   when recognition is made that new data has been written into a specific storage area of said storage area A, sending a message indicative of said recognition to said mainframe computer through said interface using said conversion unit X;
   upon receiving said message, securing a write destination area on said storage area B using said mainframe computer, said write destination area being a storage area in said storage area B into which said new data is to be stored; and
   storing a copy of said new data into said write destination area according to said recording format β using said conversion unit X.

17. A storage control apparatus comprising:
   a disk storage area A in which data is stored according to a recording format α, said recording format a being a format in which an open computer reads/writes data;
   a disk storage area B in which data is stored according to a recording format β, said recording format being a format in which a mainframe computer reads/writes data;
   an intermediate disk storage area in which data is stored according to said recording format β;
   a data IO unit x for receiving a data IO request from said open computer, and for exchanging data with said disk storage area A in response to said request;
   a data IO unit y for receiving a data IO request from said mainframe computer, and for exchanging data with said disk storage area B in response to said request; and
   a data recording format conversion unit X configured to perform steps of:
      detecting that data to be transferred has been completely written to an area of said disk storage area A according to said format a in response to a write operation,
      checking whether a data set has been secured on said intermediate disk storage area,
      sending a data set creation request to said mainframe computer when said data set has not been secured, and
      writing said data to be transferred into said data set according to said recording format β; and
   a data transfer unit configured to transfer said data stored in said data set to said disk storage area B.

18. A storage control apparatus comprising:
   a disk storage area A in which data is stored according to a recording format α, said recording format α being a format in which an open computer reads/writes data;
   a disk storage area B in which data is stored according to a recording format β, said recording format β being a format in which a mainframe computer reads/writes data;
   an intermediate disk storage area in which data is stored according to said recording format α;
   a data IO unit x for receiving a data IO request from said open computer, and for exchanging data with said disk storage area A in response to said request;
   a data IO unit y for receiving a data IO request from said mainframe computer, and for exchanging data with said disk storage area B in response to said request; and
   a data recording format conversion unit Y configured to perform steps of:
      detecting that data to be transferred has been completely written to an area of said disk storage area B according to said format in response to a write operation,
      checking whether a data set has been secured on said intermediate disk storage area,
      sending a data set creation request to said mainframe computer when said data set has not been secured, and
      writing said data into said data set according to said recording format α;
   a data transfer unit configured to transfer said data stored in said data set to said disk storage area A.

19. A storage control apparatus comprising:
   an open volume in which data is stored in FBA format;
   a mainframe volume in which data is stored in CKD format;
   an intermediate volume in which data is stored in said CKD format;
   a data IO unit x for receiving a data IO request from an open computer, and for exchanging data with said open volume in response to said request;
   a data IO unit y for receiving a data IO request from a mainframe computer, and for exchanging data with said mainframe volume in response to said request;
   a data recording format conversion unit X configured to perform steps of:
   detecting that data is written to a directory of said open volume in response to a write operation, checking whether a data set is secured on said intermediate volume, sending a data set creation request to said mainframe computer when said data set is not secured, and when said data set and an end flag data set are secured on said intermediate volume, writing said data into said data set in CKD format and an end flag indicating said data write operation is complete into said end flag data set; and a data transfer unit configured to perform steps of:

detecting said end flag is turned on, transferring said data in said data set to said mainframe volume, examining whether said end flag indicates a save attribute, and when said end flag does not indicate said save attribute, deleting said data set and end flag data set from said intermediate volume after transferring said data.

20. A storage control apparatus comprising:

an open volume in which data is stored in FBA format;

a mainframe volume in which data is stored in CKD format;

an intermediate volume in which data is stored in said CKD format;

a data IO unit x for receiving a data IO request from an open computer, and for exchanging data with said open volume in response to said request;

a data IO unit y for receiving a data IO request from a mainframe computer, and for exchanging data with said mainframe volume in response to said request;

a data recording format conversion unit Y configured to perform steps of:

detecting that data is written to a directory of said mainframe volume in response to a write operation, checking whether a data set is secured on said intermediate volume, sending a data set creation request to said mainframe computer when said data set is not secured, and when said data set and an end flag data set are secured on said intermediate volume, writing said data into said data set in CKD format and an end flag indicating said data write operation is complete into said end flag data set; and a data transfer unit configured to perform steps of:

detecting said end flag is turned on, transferring said data in said data set to said open volume, examining whether said end flag indicates a save attribute, and when said end flag does not indicate said save attribute, deleting said data set and end flag data set from said intermediate volume after transferring said data.

* * * * *